J. B. CRAWFORD.
TIRE AND RIM FOR WHEELS.
APPLICATION FILED NOV. 18, 1912.
1,081,812.
Patented Dec. 16, 1913.
2 SHEETS—SHEET 1.
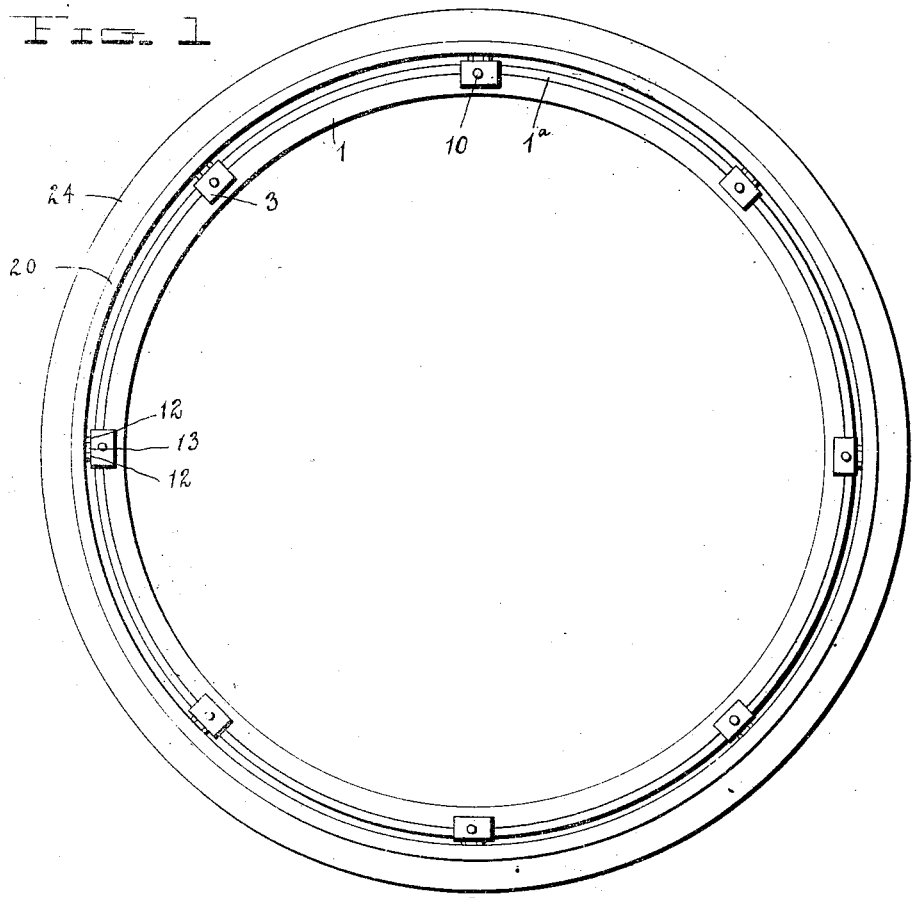
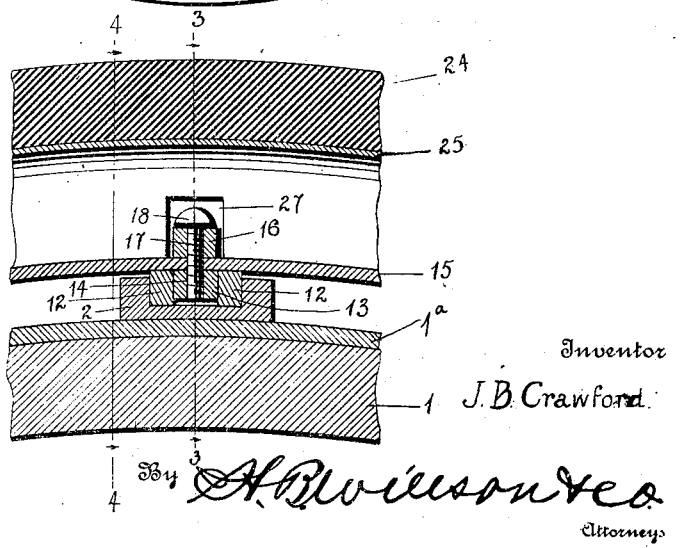
Witnesses
E. D. Haines.
C. E. Hunt.
Inventor
J. B. Crawford.
By H. B. Willson & Co.
Attorneys J. B. CRAWFORD.
TIRE AND RIM FOR WHEELS.
APPLICATION FILED NOV. 18, 1912.
1,081,812.
Patented Dec. 16, 1913.
2 SHEETS—SHEET 2.
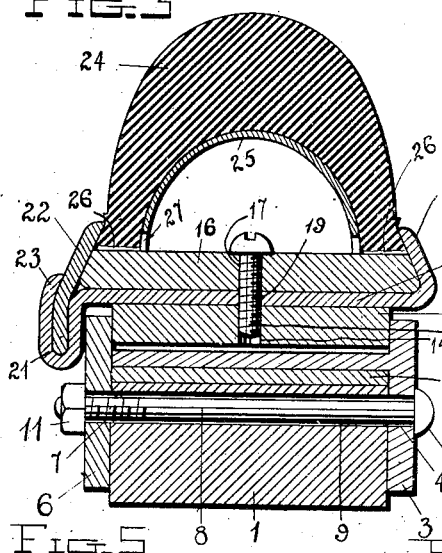
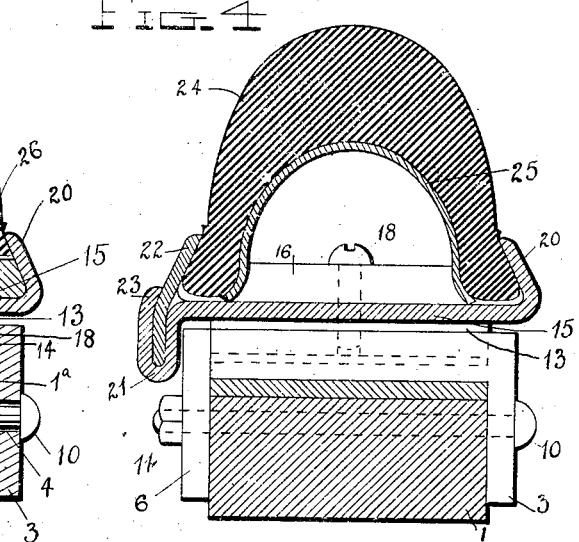
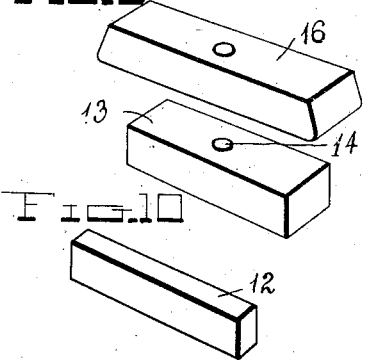
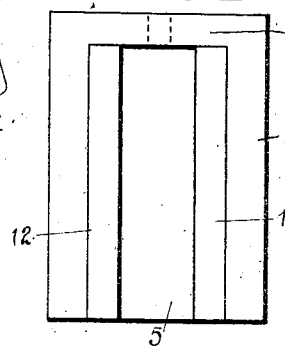
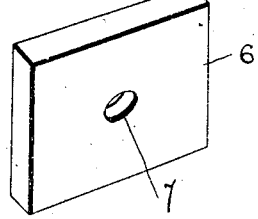
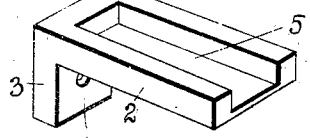
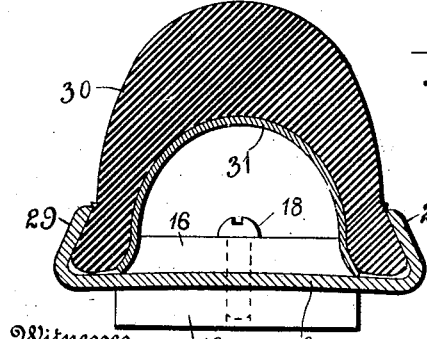
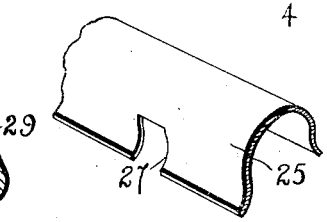
Witnesses
E. D. Haines.
C. E. Hunt
Inventor
J. B. Crawford.
By H. B. Willson & Co
Attorneys

UNITED STATES PATENT OFFICE.

JAMES B. CRAWFORD, OF SIOUX CITY, IOWA, ASSIGNOR OF ONE-HALF TO HARRY HOUGHTON.

TIRE AND RIM FOR WHEELS.

1,081,812.  Specification of Letters Patent.  Patented Dec. 16, 1913.

Application filed November 18, 1912. Serial No. 732,155.

*To all whom it may concern:*

Be it known that I, JAMES B. CRAWFORD, a citizen of the United States, residing at Sioux City, in the county of Woodbury and State of Iowa, have invented certain new and useful Improvements in Tires and Rims for Wheels; and I do declare the following to be a full, clear, and exact description of the invention, such as will enable others skilled in the art to which it appertains to make and use the same.

This invention relates to improvements in tires and rims for vehicle wheels.

One object of the invention is to provide a resilient tire spreader and rim which are so constructed and arranged that the greater the pressure applied to the tire the tighter the same will be engaged with the rim.

Another object is to provide a device of this kind with means for preventing it from creeping on the wheel.

With these and other objects in view, the invention consists of certain novel features of construction, and the combination and arrangement of parts as will be more fully described and claimed.

In the accompanying drawings; Figure 1 is a side view of a wheel showing the application of the invention; Fig. 2 is an enlarged detail longitudinal section of a portion of the felly, rim and tire; Fig. 3 is a cross sectional view taken on the line 3—3 on Fig. 2; Fig. 4 is a similar view taken on the line 4—4 of Fig. 2; Fig. 5 is a detail perspective view of the inner and outer blocks; Fig. 6 is a plan view of the felly gripping and rim attaching member; Fig. 7 is a perspective view of the detachable clamping plate employed on one end of the felly gripping and rim attaching member shown in Fig. 6; Fig. 8 is a detail perspective view of the felly gripping and rim attaching member shown in Fig. 6; Fig. 9 is a detail perspective view of the spreader; Fig. 10 is a detail perspective view of one of the anti-rattling strips or cushions employed in connection with the felly gripping and rim attaching member of the invention; Fig. 11 is a cross sectional view of a modified form of the fastener.

Referring more particularly to the drawings 1 denotes the felly of the wheel to which my improved rim and tire are applied, said felly preferably having a metal rim or band 1ª arranged thereon as shown.

The felly 1 may be constructed of any suitable material and may be of any suitable shape in cross section, said felly being here shown and is preferably of rectangular shape. Disposed at intervals around the felly band are rim attaching members comprising blocks 2 arranged transversely across the outer surface of the band, and each has formed integral with one end an inwardly projecting clamping plate or lug 3, in which is formed a bolt hole 4. In the outer side of the block 2 is formed a recess 5 the purpose of which will be hereinafter described. Adapted to rest against the open end of the block 5 opposite to the lug 3 is a gripping or clamping plate 6 having therein a bolt hole 7 with which and with the bolt hole 4 in the plate or lug 3 is engaged a clamping bolt 8, said bolt passing through a transverse bolt hole 9 in the felly 1 as clearly shown in Fig. 3 of the drawings. The head 10 of the bolt engages the plate or lug 3 while the nut 11 engages the plate 6 at the opposite end of the block, whereby when the nut is tightened up on the bolt the plates 3 and 6 will be drawn into tight clamping engagement with the opposite sides of the felly thereby firmly fastening the block 2 in position thereon.

Arranged in the recess 5 of the block 2 adjacent to the opposite sides of the recess are packing or anti-rattling strips 12 which are cushions of rubber or other suitable material. Disposed in the recess 5 in the block 2 and fitting closely between the packing or anti-rattling strips 12 is a block 13 having therein a centrally disposed screw hole 14. The blocks 13 stand inside my improved rim 15, and outside the rim opposite the blocks 13 are longer blocks 16 having therein centrally disposed screw holes 17 with which and with the screw holes 14 in the blocks 13 are engaged block attaching screws 18, said screws also passing through holes 19 in the rim 15. By this structure it will be seen that the rim 15 is spaced from the felly band but firmly attached thereto at intervals around the same.

The rim 15 is in the form of a flat metal band having along one edge a tire gripping flange 20. The opposite edge of the rim is bent inwardly and then outwardly to form a channeled flange 21 with which is engaged the inner edge of a clenching ring 22. The clenching ring 22 is bent to form an outer portion which inclines inward like the flange 20 on the opposite side of the rim and serves with said flange 20 to firmly grip and securely hold the tire in position on the rim. The clenching ring 22 is securely fastened in the channeled flange 21 of the rim by offsetting or bending the outer edge of said flange into engagement with the ring 22 as shown at 23 in Figs. 3 and 4.

The tire includes an outer tube or member 24 which may be of any suitable shape and constructed of the same material employed in the construction of the usual form of outer tire tubes or members and said outer tire member 24 has its inner edges shaped to engage or fit under the flange 20 and the outer portion of the clenching ring 22 as clearly shown in Fig. 4 of the drawings. Within the outer member 24 of the tire is an inner tube or spreader member 25 in the form of a resilient metal band which is arched in cross section to fit the outer tire member 24. The edges of the inner member 25 curve outwardly and engage the inner sides of the edges of the outer member 24 of the tire and hold said edges of the outer member in firm engagement with the flange 20 and clenching ring 22 of the rim. The edges of the tire are provided with notches 26 while the edges of the member 25 are provided with similar and registering notches 27 with which the ends of the outer blocks 16 are engaged, said blocks thus firmly holding the tire in position and preventing the same from creeping on the rim of the wheel. By constructing and arranging the tire and the rim as herein shown and described, it will be seen that the greater the pressure or load applied to the tread of the tire the more the edges of the spreader will be forced apart and the tighter the edges of the tire 24 will be forced into engagement with the flange 20 and clenching ring 22 of the rim. It will also be noted that the tire when constructed as herein shown and described will be practically puncture proof and will possess the same or more resiliency than the usual form of pneumatic tire. By attaching the rim of the tire to the felly of the wheel as herein shown and described, it will be seen that in order to remove the rim and tire it is necessary simply to unscrew the nuts 11 from the bolts 8 of the rim attaching blocks 2, whereupon the clamping plates 6 may be disengaged from the ends of the bolts and the inner and outer blocks, together with the rim and tire, may be slipped off from the rim, the blocks 13 sliding out of the open ends of the recesses 5 in the blocks 2 as will be readily understood.

In Fig. 11 of the drawings is shown a modified form of rim 28 both edges of which are turned outwardly in two slightly converging flanges 29 with which the edges of the outer member 30 of the tire are engaged. The tire in the modified form of the invention is provided with an inner tube or spreader 31 and is otherwise constructed in the same manner as the tire shown in the first form of the invention, the rim 28 of the modified form is also provided with tire holding blocks and rim attaching blocks constructed and arranged in the same manner as the corresponding blocks of the first form of the invention, and said modified form of the tire is applied and fastened to the felly of the wheel in the same manner as the preferred form of the tire.

In either form of this device the parts are assembled by first placing the blocks in pairs upon the rim, whose left-hand flange 29 or the outer edge of whose clenching ring 22 will at this time be bent outward, then placing the rubber tire or tread over the spreader and putting these members in place around the rim with their notches in engagement with the outer block 16, and finally bending the outer edge of the ring 22 or the left hand flange 29 inward so that the parts stand respectively as seen in Figs. 3 and 11. While it is true that a worn tread and its spreader may be replaced by machinery, it is not contemplated that the average automobilist will possess machinery, but in case of accident he merely slips a new rim and its tire onto the wheel and secures it in place by my preferred means above described and with which the inner blocks 13 coact very nicely as has been explained.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined and claimed.

Having thus particularly described my invention, what I claim is:

1. The combination with an arched tread and an arched metallic spreader inside the tread, the edges of these elements having registering notches; of a rim having a channel within which the edges of said element are embraced, a block extending across the outer face of the rim through said notches, and means for detachably connecting said block with the rim.

2. The combination with an arched tread, and an arched metallic spreader inside the tread and having its edges bent outward within the edges of the tread, the edges of these elements having registering notches;

of a rim having a channel within which the edges of the tread are embraced, and a block extending across said rim and fitting in said notches.

3. The combination with an arched tread, and an arched metallic spreader inside the tread, the edges of these elements having registering notches, a rim having a channel within which the edges of the tread are embraced, a block extending across the outer face of the rim through such notches and with its extremities engaged by the flanges of the rim, a second and shorter block extending across the inner face of the rim, and means for connecting said blocks for clamping them against opposite faces of the rim.

In testimony whereof I have hereunto set my hand in presence of two subscribing witnesses.

JAMES B. CRAWFORD.

Witnesses:
  HENRY J. SCHEICH,
  GERTRUDE L. ANDERSON.